(12) United States Patent
Grun et al.

(10) Patent No.: US 8,960,473 B2
(45) Date of Patent: Feb. 24, 2015

(54) FUEL TANK

(75) Inventors: Karl-Peter Grun, Sankt Augustin (DE);
Ibrahim Koukan, Cologne (DE);
Waldemar Nickel, Neufahrn (DE)

(73) Assignee: Kautex Textron GmbH & Co. KG,
Bonn (DE)

( * ) Notice: Subject to any disclaimer, the term of this patent is extended or adjusted under 35 U.S.C. 154(b) by 1316 days.

(21) Appl. No.: 12/634,995

(22) Filed: Dec. 10, 2009

(65) Prior Publication Data
US 2010/0147863 A1 Jun. 17, 2010

(30) Foreign Application Priority Data

Dec. 10, 2008 (DE) .......................... 10 2008 061 264

(51) Int. Cl.
*B65D 49/00* (2006.01)
*B60K 15/035* (2006.01)
*B60K 15/04* (2006.01)

(52) U.S. Cl.
CPC ..... *B60K 15/03504* (2013.01); *B60K 15/03519* (2013.01); *B60K 15/04* (2013.01); *B60K 2015/03509* (2013.01); *B60K 2015/03514* (2013.01); *B60K 2015/03571* (2013.01); *B60K 2015/03576* (2013.01); *B60K 2015/03552* (2013.01)
USPC ........................................ 220/86.2; 137/588

(58) Field of Classification Search
USPC ...................... 137/588; 141/59; 220/86.2, 746
See application file for complete search history.

(56) References Cited

U.S. PATENT DOCUMENTS

| 4,926,914 | A | * | 5/1990 | Morizumi et al. | 141/59 |
| 4,934,417 | A | * | 6/1990 | Bucci | 141/1 |
| 5,282,497 | A | * | 2/1994 | Allison | 141/59 |
| 5,462,100 | A | * | 10/1995 | Covert et al. | 141/59 |
| 5,983,963 | A | | 11/1999 | Pozgainer et al. | |
| 6,105,612 | A | * | 8/2000 | Schaar | 137/588 |
| 6,708,724 | B2 | * | 3/2004 | Morinaga | 137/588 |
| 6,732,759 | B2 | | 5/2004 | Romanek et al. | |
| 6,957,658 | B2 | * | 10/2005 | Aschoff et al. | 137/202 |
| 7,617,851 | B2 | * | 11/2009 | Barnes et al. | 141/286 |
| 7,694,665 | B2 | | 4/2010 | Ehrman et al. | |
| 2008/0308072 | A1 | * | 12/2008 | Banerjee et al. | 123/518 |

FOREIGN PATENT DOCUMENTS

DE     102006004630     8/2007

* cited by examiner

*Primary Examiner* — Jacob K Ackun
*Assistant Examiner* — Jenine Pagan
(74) *Attorney, Agent, or Firm* — Grossman Tucker Perreault & Pfleger, PLLC

(57) ABSTRACT

The invention relates to a fuel tank having at least one filler pipe (2) enclosing a refueling duct (13), at least one operational venting valve (11), at least one refueling venting valve (8) and at least one venting line (9), which is connected to a filler head (3) of the filler pipe (2). The filler head (3) comprises a valve, which when refueling closes a flow path from the venting line (9) into the refueling duct (13). One of outstanding features of the fuel tank is that the venting line (9) is embodied as a collective venting line for the refueling and operational venting and that in any switching position of the valve it communicates with a downstream fuel vapor filter (10) connected to the filler head (3).

20 Claims, 3 Drawing Sheets

Figure 1:
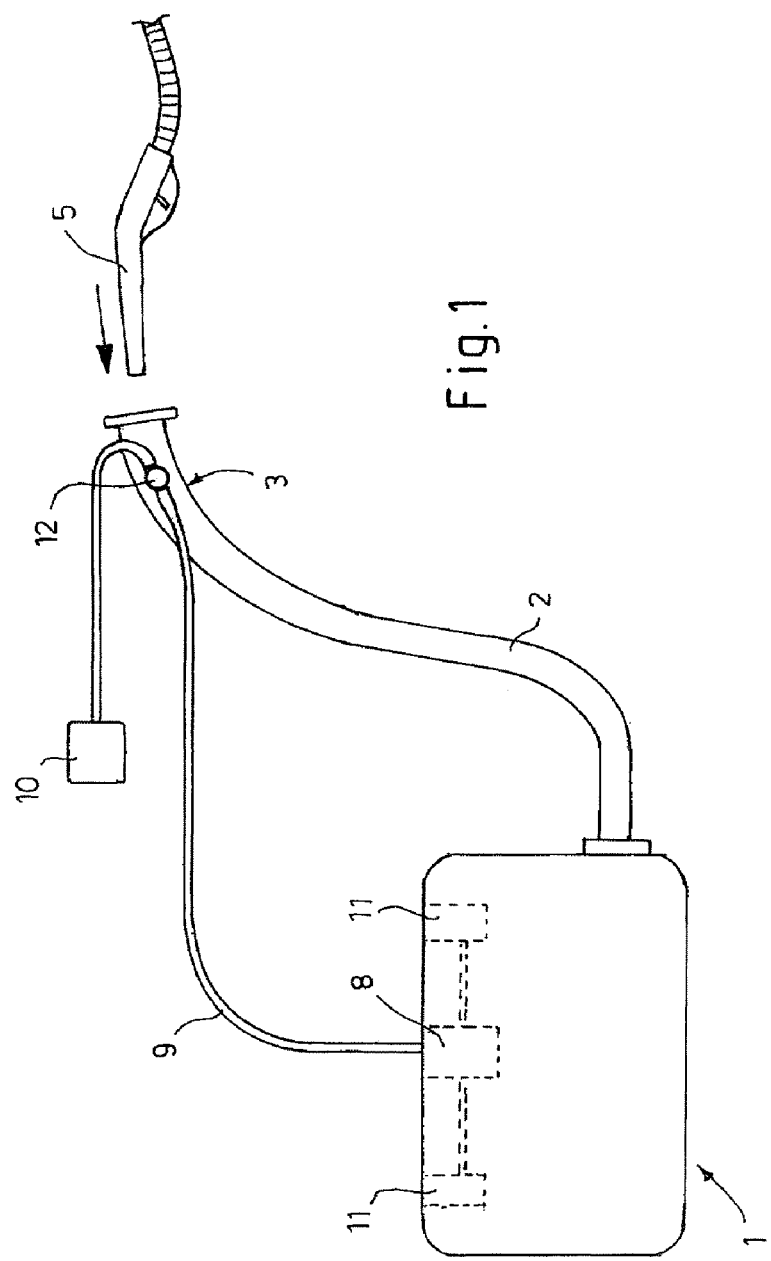

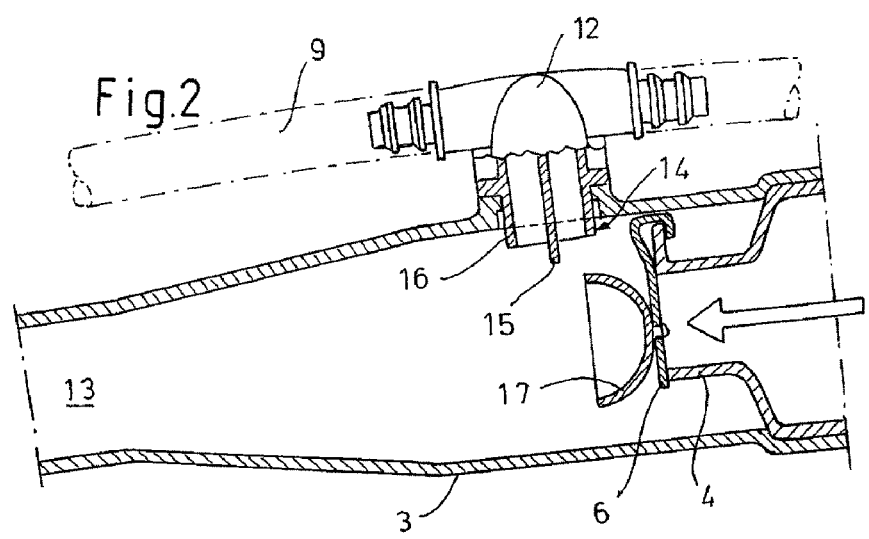
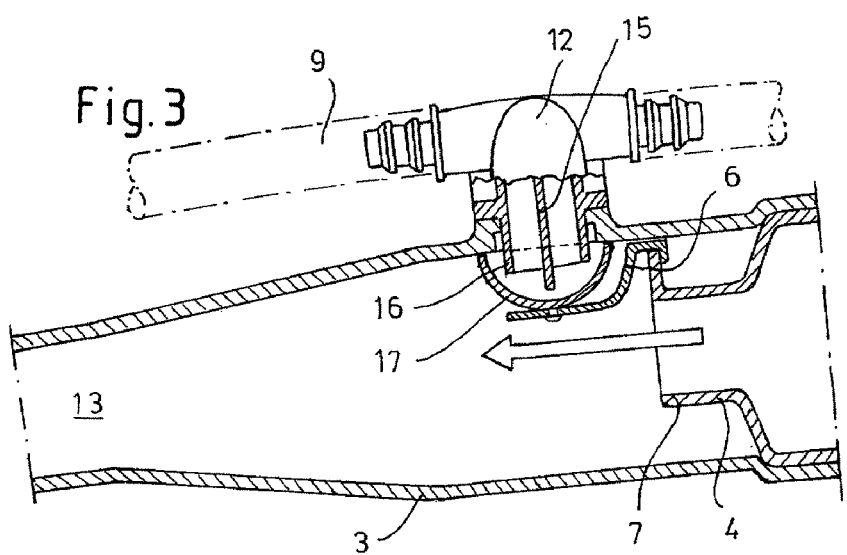

FUEL TANK

The invention relates to a fuel tank having at least one filler pipe enclosing a refueling duct, at least one operational venting valve, at least one refueling venting valve and at least one venting line, which is connected to a filler head of the filler pipe, the filler head having at least one valve, which can be switched by inserting a nozzle device into the filler neck and which in a first switching position (refueling position) closes a flow path from the venting line into the refueling duct and in a second switching position (operational position) opens said line.

A fuel tank of the aforementioned type is disclosed, for example, by patent application DE 10 2006 004 630. In the filler pipe described there the filler head comprises at least one switching valve, which in a first switching position opens a flow path from the refueling venting line to a venting duct, connected to which downstream is a fuel vapor filter. In the refueling position of the switching valve a connection of the operational venting line to the refueling duct is closed, whereas in a second switching position a connection of the operational venting line to the refueling duct is opened and the flow path from the refueling venting line to the venting duct is closed. The switching valve in a known manner serves to connect the fuel vapor filter either to the refueling venting line or to the operational venting line, depending on the prevailing operating state (refueling or operational). The switching process is in each case brought about by introducing the fuel pump nozzle into the filler head of the filler pipe. This arrangement is relatively intricate in terms of circuitry and in the design of the filler head, moreover, insufficient account is taken of the fact that additional measures to separate liquid fuel from the fuel gas would be desirable.

Although in the operational venting line to the fuel vapor filter a fuel drainage is provided in the refueling duct, this is not sufficient, without additional measures, to separate the so-called liquid carry-over from the volumetric flow of fuel gas.

This is difficult particularly when the flow ducts are designed with small cross sections, producing relatively high flow velocities of the fuel gases escaping from the fuel tank.

EP 0 882 617 A2, for example, likewise discloses a device for controlling the gas flows and the liquid level in an on-board refueling vapor recovery (ORVR) system having the features of the pre-characterizing part of Claim 1. In the case of the device described there the refueling and operational venting lines are led via a common multi-way valve at the filler head. This multi-way valve is also switched, by inserting a fuel pump nozzle into the filler neck or into the filler pipe, from a refueling position, in which the refueling venting line is opened and the operational venting line is closed, into an operational position, in which the operational venting line is opened and the refueling venting line is closed.

Another comparable arrangement is disclosed by U.S. Pat. No. 6,732,759 B2, for example.

The aforementioned arrangements are also of relatively complex design. Additional measures and additional swirl pots may be necessary for separating the liquid carry-over.

The object of the invention is therefore to improve a fuel tank of the aforementioned type in respect of this.

The object is first achieved by a fuel tank having at least one filler pipe or filler neck enclosing a refueling duct, at least one operational venting valve, at least one refueling venting valve and at least one venting line, which is connected to a filler head of the filler pipe, the filler head having at least one valve, which can be switched by initiating the refueling process and which in a first switching position (refueling position) closes a flow path from the venting line into the refueling duct and in a second switching position (operational position) opens said line, the outstanding feature of the fuel tank according to the first variant of the invention being that the venting line is embodied as a collective venting line for the refueling and operational venting and that in any switching position of the valve it communicates with a downstream fuel vapor filter connected to the filler head.

The switching process can be initiated by introducing a nozzle device, for example a fuel pump nozzle, into the filler pipe or, for example, by removing a filler pipe cap.

One measure in particular, that of leading the operational venting and the refueling venting via a common line to the fuel vapor filter, obviates the need for measures designed to shut off one or the other line depending on the operating state. In the design of the filler pipe according to the invention the filler pipe itself advantageously serves to receive the liquid carry-over in dynamic running, that is to say in the operational state of the motor vehicle. According to the invention the filler pipe in the operational venting path forms a swirl volume, which with the aid of the expanded volume of the filler pipe allows liquid hydrocarbon to be separated from the fuel gas. In operation of the motor vehicle, therefore, the filler pipe is used as a liquid trap for the liquid hydrocarbons that occur due to the vehicle dynamics. The valve provided in the filler head serves when refueling the fuel tank to ensure that no liquid hydrocarbons can pass via the refueling duct into the venting path.

In a variant of the fuel tank according to the invention the venting line communicates via a branch line with the refueling duct, and at least one droplet separator for liquid hydrocarbons is provided in the area of the branch line.

At least one dividing wall or baffle wall, for example, may be provided in a venting duct of the filler head as droplet separator.

The dividing wall may cover the entire cross section of the venting duct, so that the dividing wall forms a type of siphon in the venting duct.

The dividing wall suitably extends into the branch line to the refueling duct.

The dividing wall may protrude into the refueling duct, for example, so that the volumetric flow of gas occurring during the venting is twice deflected by 90°.

The valve preferably comprises a pivotally supported valve body designed as a flexible sealing element, which can be actuated by introducing a nozzle device into the filler neck.

The valve body may be fixed, for example, to a sealing flap of the filler neck which is held, spring loaded, in the closed position, the closed position of the sealing flap corresponding to the second switching position of the valve body. The so-called unleaded flap, for example, which is outstandingly well-suited for fixing a correspondingly designed valve body to the flap, may be provided as such a sealing flap. On introduction of the nozzle device or fuel pump nozzle into the filler pipe the unleaded flap may be swiveled out of its position closing the filler pipe, and in so doing may close a connection between the venting line and the refueling duct by means of the valve body. It is not necessarily essential here for the valve body to hermetically seal off the connection between the venting line and the refueling duct.

In a suitable variant of the fuel tank according to the invention the valve body is embodied as a cupped sealing element with the concave side facing in the direction of the closing movement, which interacts as a valve seat with a branch line of the venting line projecting into the refueling duct or fully encloses the latter, sealing it off.

In order to avoid overloading the fuel vapor filter when refueling, a recirculation aperture, which allows recirculation of the volumetric flow of refueling gas through the filler pipe, may be formed in the valve body.

The object is further achieved with at least one filler pipe enclosing a refueling duct, at least one operational venting valve, at least one refueling venting valve and at least one venting line, which is connected to a filler head of the filler pipe, the filler head having at least one valve, which can be switched by inserting a nozzle device into the filler pipe and from a first switching position (refueling position) closes a flow path from the venting line into the refueling duct and in a second switching position (operational position) opens said line, the outstanding feature of the fuel tank being that means are provided for conducting the operational venting volumetric flow through the refueling duct of the filler pipe to the fuel vapor filter.

This is regarded as an independently patentable aspect of the invention, irrespective of whether one or more venting lines are now led via the filler head of the filler pipe to the fuel vapor filter. By conducting at least a proportion of the operational venting volumetric flow through the refueling duct of the filler pipe to the fuel vapor filter during ordinary operation of the motor vehicle, the refueling duct of the filler pipe is advantageously used as swirl and/or settling volume for the volumetric flow of gas occurring due to the vehicle dynamics, obviating the need for additional measures such as swirl pots, for example.

Further advantageous developments of this variant of the fuel tank will be apparent from the features in the dependent claims for the first variant of the fuel tank according to the invention.

Figure 4:
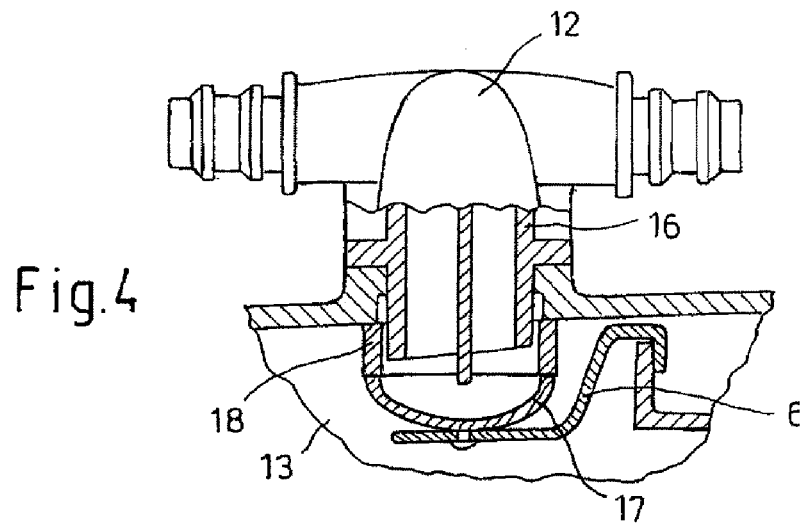
Figure 5:
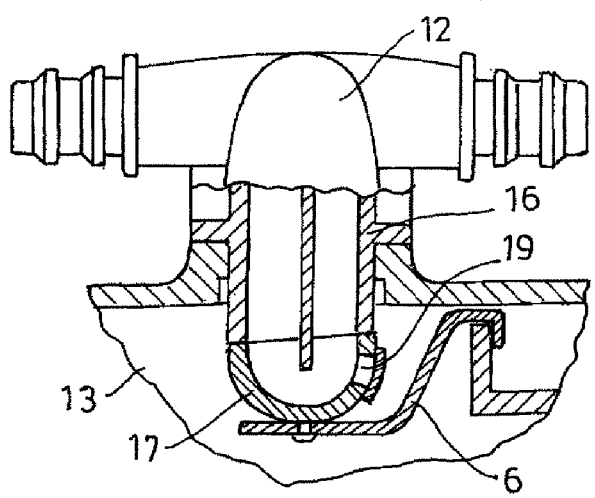
Figure 6:
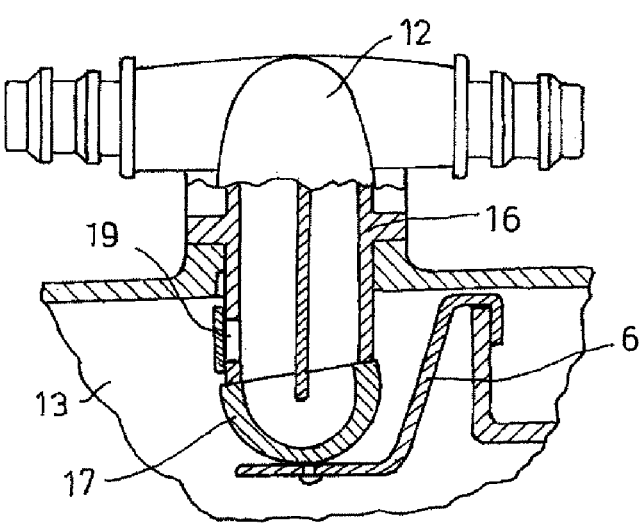

The invention will be explained below with reference to the drawings attached, in which FIG. 1 shows a schematic view of a fuel tank according to the invention, FIG. 2 shows a section through the filler pipe of the fuel tank in the area of the filler head with the valve in the operational position, FIG. 3 shows a sectional view corresponding to FIG. 2 with the valve in the refueling position and FIGS. 4 to 6 show different variants of the valve with the valve body in the refueling position.

Where reference is made above or hereinafter to the operational position this operational position also encompasses the stationary state of the motor vehicle and signifies the non-refueling state.

Reference will first be made to FIG. 1. There a fuel tank 1 with a filler pipe 2 having an underfloor connection thereto is shown greatly simplified. The fuel tank 1 described is integrally formed from thermoplastic material and is integrally joined to the filler pipe 2. The fuel tank 1 may be embodied, for example, as a multilayer, extrusion blow molded plastic fuel tank. However, the invention is not limited to such an embodiment.

The filler pipe 2 of the fuel tank 1 is provided at its end remote from the fuel tank 1 with a filler head 3, in the area of which the filler pipe 3 has an enlarged diameter and is provided with a funnel-shaped insert 4 for receiving and guiding a nozzle device 5 in the form of a fuel pump nozzle or the like.

A pivotally supported sealing flap 6, commonly referred to as a so-called unleaded flap, is provided on the insert 4. This sealing flap 6 is unlocked and displaced into the opened position shown in FIG. 3 when the fuel pump nozzle is introduced through the orifice pipe 7 of the insert 4. The refueling process can then be initiated. The fuel flowing through filler pipe 2 into the fuel tank 1 displaces the volume of gas present above the fuel level in proportion to the amount of fuel admitted. Via a refueling venting valve denoted by 8 and through the venting line denoted by 9 this volume of gas, cleaned by a fuel vapor filter 10, is given off to the atmosphere. The fuel vapor filter 10 is embodied as a single or multistage activated charcoal filter.

During non-refueling periods, that is to say whilst underway and whilst the vehicle is at a standstill, the fuel tank 1 is vented via the operational venting valves 11. The volumetric flow of gas occurring during operation of the motor vehicle under the effects of temperature and surge movements of the fuel as a result of the vehicle dynamics escapes from the fuel tank 1 via the operational venting valves 11, which are provided at so-called venting points of the fuel tank above the maximum liquid level.

In the exemplary embodiments shown the operational venting valves 11 are connected by lines (not shown) in the interior of the fuel tank 1 to the refueling venting valve 8 on a common venting line 9, which according to the invention is embodied as a collective venting line. In order to afford a safeguard against overfilling the tank, the operational venting valves 11 are embodied as pressurizing valves. Alternatively they may be separately switchable in as much as they are closed during the refueling process. The venting line 9 is connected to the filler head 3 of the filler pipe 2 by an approximately T-shaped connection piece 12. The connection piece 12 is embodied as a double nipple, for example, and establishes a connection between the venting path and the refueling duct 13 enclosed by the filler pipe 2. The venting line 9 forming the venting path is not represented in FIG. 3; this is twisted onto the two free ends of the connection piece 12, as is shown in FIG. 1.

The connection piece 12 is suitably composed of thermoplastic material and is welded to the filler head 3 in the area of an aperture 14 therein.

With the sealing flap 6 in the closed position, as can be seen from FIG. 2, for example, the refueling duct 13 can communicate with the venting path or the venting line. The closed position of the sealing flap represents the non-refueling state. In this case the fuel vapors led via the venting line 9 are able to circulate via the refueling duct 13 to the fuel vapor filter 10, the direct path through the connection piece 12 being closed by a dividing wall 15. The dividing wall 15 extends in the branch line 16 of the connection piece 12 projecting into the refueling duct 13 in such a way that the gas flows inside the connection piece 12 occurring due to the vehicle dynamics, for example, are diverted by way of the dividing wall 15 into the refueling duct 13 and thence back into connection piece and ultimately pass to the fuel vapor filter 10. The dividing wall 15 here serves on the one hand as droplet separator and on the other as flow baffle element for diverting and deflecting the gas flow through the filler pipe 2. Due to the expansion in cross section thereby created in the venting path, the filler pipe 2 or its refueling duct 13 serves as swirl pot. Any liquid hydrocarbons accumulating there pass back into the fuel tank 1. Due to the pressure ratios prevailing in the fuel tank 1 and in the filler pipe 2, a venting of the fuel tank 1 via the fuel vapor filter 10 is assured at all times.

A valve body 17, which is composed of an elastic material, such as plastic, rubber, EPDM-rubber or the like is provided on the side of the sealing flap 6 facing the interior of the tank. On its side facing the interior of the fuel tank 1 the valve body 17 is of a cupped or convex shape.

If the sealing flap 6 is pivoted into the position shown in FIG. 3 by a fuel pump nozzle introduced into the orifice pipe 7, the valve body 17 encloses the part of the branch line 16 projecting into the refueling duct 13, so that no liquid fuel can get into the venting path but so that the venting function is still ensured via the venting line 9. This is brought about, among other things, in that the valve body 17 is arranged with a gap in relation to the end face of the dividing wall 15, so that the volumetric flow of gas carried in the venting line 9 can still flow around the dividing wall 15. The dividing wall 15 inside the branch line 16 here forms a type of siphon, in which liquid hydrocarbons can likewise collect. As soon as the fuel pump nozzle is withdrawn from the orifice pipe 7 and the sealing flap 6 returns, spring-loaded, to the position shown in FIG. 2, the fuel collected in the valve body 17 is returned into the filler pipe 2.

As has already been mentioned above, the valve body 17 need not necessarily seal off the venting line 9 hermetically from the filler pipe 2 or the refueling duct 13 of the filler pipe 2.

In the variant shown in FIG. 3 the valve body 17 in the refueling position bears against the inside wall of the filler pipe 2.

FIGS. 4 to 6 represent alternative exemplary embodiments, particularly of the valve body 17.

In the variant represented in FIG. 4 the valve body 17 bears with the end face of its edge against the end face of a cylindrical sealing sleeve 18.

In the variant represented in FIG. 5 the valve body 17 is designed so that its end face bears against the end face of the branch line 16 projecting into the refueling duct 13. A similar variant is shown in FIG. 6.

In the variants of the filler pipe 2 formed according to the invention represented in FIGS. 5 and 6, additional provision is in each case made for a recirculation aperture 19, which when refueling allows a recirculation of fuel vapors from the venting line 9 into the refueling duct 13.

In the variant shown in FIG. 5 the recirculation aperture 19 is provided in the valve body 17, whereas in the variant shown in FIG. 6 the recirculation aperture 19 is provided in a section of the branch line 16 projecting into the refueling duct 13.

LIST OF REFERENCE NUMERALS

1 fuel tank
2 filler pipe
3 filler head
4 insert
5 nozzle device
6 sealing flap
7 orifice pipe
8 refueling venting valve
9 venting line
10 fuel vapor filter
11 operational venting valves
12 connection piece
13 refueling duct
14 aperture
15 dividing wall
16 branch line
17 valve body
18 sealing sleeve
19 recirculation aperture

The invention claimed is:
1. Fuel tank comprising:
at least one filler pipe enclosing a refueling duct,
at least one operational venting valve,
at least one refueling venting valve and
at least one venting line, which is connected to a filler head of the filler pipe,
the filler head having at least one switching valve, which is switchable by initiating the refueling process and which, in a first switching position as a refueling position, the switching valve is configured to close a flow path from the venting line into the refueling duct and, in a second switching position as a operational position, the switching valve is configured to open the flow path from the venting line into the refueling duct,
wherein the venting line is a collective venting line comprising a refueling venting line when the at least one switching valve is in the first switching position and an operational venting line when the at least one switching valve is in the second switching position, and wherein, in either the first switching position or the second switching position of the switching valve, the collective venting line remains open to a flow of fuel vapors from the fuel tank to a downstream fuel vapor filter connected to the filler head.

2. Fuel tank according to claim 1, characterized in that the venting line communicates via a branch line with the refueling duct, and that at least one droplet separator for liquid hydrocarbons is provided in the area of the branch line.

3. Fuel tank according to claim 1, characterized in that at least one dividing wall is provided in a venting duct of the filler head as a droplet separator.

4. Fuel tank according to claim 3, characterized in that the dividing wall closes the cross section of the venting duct, so as to cause a diversion of all venting from the venting line into the refueling duct when the switching valve is in the second switching position.

5. Fuel tank according to claim 3, characterized in that the dividing wall extends into the branch line to the refueling duct.

6. Fuel tank according to claim 3, characterized in that the dividing wall protrudes into the refueling duct.

7. Fuel tank according to claim 1, characterized in that the at least one switching valve comprises a pivotally supported valve body comprising a flexible sealing element, which is actuated by introducing a nozzle device into the filler pipe.

8. Fuel tank according to claim 7, characterized in that the valve body is fixed to a sealing flap of the filler pipe, which is held, spring loaded, in the closed position, the closed position corresponding to the second switching position of the valve body.

9. Fuel tank according to claim 7, characterized in that the valve body comprises a cupped sealing element with the concave side facing in the direction of the closing movement, which seats with a branch line of the venting line projecting into the refueling duct or fully encloses the branch line, sealing it off.

10. Fuel tank according to claim 7, characterized in that the valve body comprises a recirculation aperture.

11. Fuel tank comprising:
at least one filler pipe enclosing a refueling duct,
at least one operational venting valve,
at least one refueling venting valve and
at least one venting line, which is connected to a filler head of the filler pipe,
the filler head having at least one switching valve, which is switchable by inserting a nozzle device into the filler pipe and from a first switching position as a refueling position, the switching valve is configured to close a flow path from the venting line into the refueling duct and in a second switching position as a operational position, the switching valve is configured to open the flow path from the venting line into the refueling duct, wherein, when the switching valve is in the second switching position, the flow path from the venting line into the refueling duct is arranged such that all of a flow of fuel vapor from the tank must flow from the venting line and into the refueling duct of the filler pipe before at least a portion of the fuel vapor flows to a fuel vapor filter.

12. Fuel tank according to claim 11 characterized in that the venting line communicates via a branch line with the refueling duct, and that at least one droplet separator for liquid hydrocarbons is provided in the area of the branch line.

13. Fuel tank according to claim 11 characterized in that at least one dividing wall is provided in a venting duct of the filler head as a droplet separator.

14. Fuel tank according to claim 13 characterized in that the dividing wall closes the cross section of the venting duct, so as to cause a diversion of all venting from the venting line into the refueling duct when the switching valve is in the second switching position.

15. Fuel tank according to claim 13 characterized in that the dividing wall extends into the branch line to the refueling duct.

16. Fuel tank according to claim 13 characterized in that the dividing wall protrudes into the refueling duct.

17. Fuel tank according to claim 11 characterized in that the at least one switching valve comprises a pivotally supported valve body comprising a flexible sealing element, which is actuated by introducing a nozzle device into the filler pipe.

18. Fuel tank according to claim 17 characterized in that the valve body is fixed to a sealing flap of the filler pipe, which is held, spring loaded, in the closed position, the closed position corresponding to the second switching position of the valve body.

19. Fuel tank according to claim 17 characterized in that the valve body comprises a cupped sealing element with the concave side facing in the direction of the closing movement, which seats with a branch line of the venting line projecting into the refueling duct or fully encloses the branch line, sealing it off.

20. Fuel tank according to claim 17 characterized in that the valve body comprises a recirculation aperture.

* * * * *